US011083068B2

(12) United States Patent
Wu et al.

(10) Patent No.: US 11,083,068 B2
(45) Date of Patent: Aug. 3, 2021

(54) MULTI-SPECTRUM GENERATING DEVICE AND METHOD THEREOF

(71) Applicant: FUJIAN SANAN SINO-SCIENCE PHOTOBIOTECH CO., LTD., Quanzhou (CN)

(72) Inventors: Chanjuan Wu, Quanzhou (CN); Liang Zeng, Quanzhou (CN); Pingqiu Lin, Quanzhou (CN); Nana Li, Quanzhou (CN); Ruiyong Lin, Quanzhou (CN); Zhuo Zhan, Quanzhou (CN)

(73) Assignee: FUJIAN SANAN SINO-SCIENCE PHOTOBIOTECH CO. LTD., Quanzhou (CN)

( * ) Notice: Subject to any disclaimer, the term of this patent is extended or adjusted under 35 U.S.C. 154(b) by 133 days.

(21) Appl. No.: 16/347,810

(22) PCT Filed: Dec. 25, 2018

(86) PCT No.: PCT/CN2018/123385
§ 371 (c)(1),
(2) Date: May 7, 2019

(87) PCT Pub. No.: WO2019/205685
PCT Pub. Date: Oct. 31, 2019

(65) Prior Publication Data
US 2021/0051784 A1  Feb. 18, 2021

(30) Foreign Application Priority Data

Apr. 28, 2018 (CN) .......................... 201810403740.8

(51) Int. Cl.
*H05B 47/10* (2020.01)
*F21V 29/74* (2015.01)
(Continued)

(52) U.S. Cl.
CPC ............. *H05B 47/10* (2020.01); *A01G 7/045* (2013.01); *F21V 29/74* (2015.01); *F21V 29/767* (2015.01); *F21V 29/83* (2015.01); *F21V 29/89* (2015.01)

(58) Field of Classification Search
CPC ....... H05B 47/10; F21V 29/74; F21V 29/767; F21V 29/83; F21V 29/89; F21V 3/02;
(Continued)

(56) References Cited

U.S. PATENT DOCUMENTS

2012/0218750 A1  8/2012 Klase et al.
2013/0162147 A1  6/2013 Jiang
(Continued)

FOREIGN PATENT DOCUMENTS

CN  101578477 A  11/2009
CN  102577886 A  7/2012
(Continued)

*Primary Examiner* — Daniel D Chang
(74) *Attorney, Agent, or Firm* — Dragon Sun Law Firm, PC; Jinggao Li, Esq.

(57) ABSTRACT

A multi-spectrum generating device and method thereof. The multi-spectrum generating device includes at least one first luminaire, at least one second luminaire, and a control component. The first luminaire and the second luminaire each have a light source. The control component is connected to the first luminaire and the second luminaire for controlling the first luminaire and the second luminaire. In the present application, by controlling the switches of the first luminaire and the second luminaire, the multi-spectrum can be realized, so as to meet some special requirements of photobiological regulation. Moreover, the first luminaire and the second luminaire are mutually independently controlled luminaires and are controlled by different power sources, so the control circuit is simple and has a low cost, without affecting the primary demanded spectra provided by the first (Continued)

luminaire. Therefore, the present application has high utilization rate and high flexibility in use.

17 Claims, 6 Drawing Sheets

(51) Int. Cl.
*A01G 7/04* (2006.01)
*F21V 29/89* (2015.01)
*F21V 29/76* (2015.01)
*F21V 29/83* (2015.01)

(58) Field of Classification Search
CPC .......... F21V 7/005; F21V 29/76; F21V 15/01; F21V 31/00; A01G 7/045; F21S 8/06
See application file for complete search history.

(56) References Cited

U.S. PATENT DOCUMENTS

| | | | | |
|---|---|---|---|---|
| 2014/0055041 | A1* | 2/2014 | Ramer | H05B 47/10 |
| | | | | 315/153 |
| 2015/0305108 | A1* | 10/2015 | Probasco | A01G 22/00 |
| | | | | 47/58.1 LS |
| 2016/0128155 | A1* | 5/2016 | Petluri | H05B 45/37 |
| | | | | 315/294 |
| 2016/0192598 | A1 | 7/2016 | Haggarty | |
| 2018/0116025 | A1* | 4/2018 | Adams | A01G 9/249 |

FOREIGN PATENT DOCUMENTS

| | | |
|---|---|---|
| CN | 102840481 A | 12/2012 |
| CN | 203010279 U | 6/2013 |
| CN | 103563101 A | 2/2014 |
| CN | 104684380 A | 6/2015 |
| CN | 108591883 A | 9/2018 |
| GB | 2382014 B | 10/2005 |
| JP | H11266704 A | 10/1999 |

\* cited by examiner

MULTI-SPECTRUM GENERATING DEVICE AND METHOD THEREOF

CROSS REFERENCE TO THE RELATED APPLICATIONS

This application is the national phase entry of International Application No. PCT/CN2018/123385, filed on Dec. 25, 2018, which is based upon and claims priority to Chinese Patent Application No. 201810403740.8, filed on Apr. 28, 2018, the entire contents of which are incorporated herein by reference.

TECHNICAL FIELD

The present invention relates to a multi-spectrum generating device.

The present invention further relates to a multi-spectrum generating method.

BACKGROUND

The plant growth lighting device, as the name implies, is a lighting device (or a luminaire) used for plants. The plant growth lighting device simulates the principle that plants need sunlight for photosynthesis, so as to provide supplementary lighting or completely replace the sunlight for plants. At present, with the development of photobiological regulation technology, the illumination means for plant growth is no longer monotonous. Different regulatory measures and different spectra can be adopted for different plants or different growth stages of the same plant. For example, in the late stage of plant growth, for plants yielding flowers or fruits, infrared or ultraviolet light is usually used for short-term induction in the photobiology study, which requires the plant growth lighting device to provide multiple spectra. However, for some special wave bands, the used radiation has low total illumination and short use time. If such a spectral demand and the primary spectral demand throughout the growth cycle are integrated into the same plant growth lighting device, there is a high requirement for the performance of the plant growth lighting device, the control circuit is complex, the overall cost of the device is relatively higher, and the utilization rate of special wave bands is low. Especially for users with research needs, there is a low utilization flexibility.

SUMMARY

In view of the above-described drawbacks of the prior art, the objective of the present invention is to provide a multi-spectrum generating device with lowered cost and easy control.

To achieve the above objective, the present invention provides a multi-spectrum generating device including at least one first luminaire, at least one second luminaire, and a control component. The first luminaire and the second luminaire each have a light source. The control component is connected to the first luminaire and the second luminaire for controlling the first luminaire and the second luminaire.

Further, the first luminaire and the second luminaire are mutually independently controlled luminaires.

Further, the first luminaire and the second luminaire are integrally controlled luminaires.

The present invention further provides a multi-spectrum generating method, including the following steps:

S1: providing at least one first luminaire and at least one second luminaire, wherein the first luminaire and the second luminaire each have a light source; and S2: controlling the at least one first luminaire and the at least one second luminaire to achieve at least two spectra.

Further, the multi-spectrum generating method further includes step A1 including setting position parameters between the first luminaire and the second luminaire according to a preset width $W_{target}$ of an illumination target area on an illumination receiving surface to make a width $W_{overlap}$ of an overlapped illumination area of the first luminaire and the second luminaire on the illumination receiving surface greater than or equal to the width $W_{target}$ of the illumination target area.

Further, the second luminaire is located at a central position of the plurality of first luminaires. A width $W_1$ of the illumination area of the first luminaire on the illumination receiving surface is greater than or equal to the width $W_{target}$ of the illumination target area. A width $W_2$ of the illumination area of the second luminaire on the illumination receiving surface is greater than or equal to the width $W_{target}$ of the illumination target area.

Further, the second luminaire deviates from a center position of a plurality of first luminaires, and a deviation distance is L. A width $W_1$ of the illumination area of the first luminaire on the illumination receiving surface is greater than or equal to the width $W_{target}$ of the illumination target area. A width $W_2$ of the illumination area of the second luminaire on the illumination receiving surface subtracting 2L is greater than or equal to the width $W_{target}$ of the illumination target area.

Further, when a plurality of second luminaires are provided, the plurality of second luminaires have identical spectra, partially identical spectra, or different spectra.

Further, a spectrum of the first luminaire and a spectrum of the second luminaire are different.

Further, both of the first luminaire and the second luminaire are plant luminaires.

As described above, the multi-spectrum generating device and method of the present invention have the following advantages.

In the present application, the switches of the first luminaire and the second luminaire are controlled to achieve multi-spectrum, so as to meet some special requirements of photobiological regulation. Moreover, the first luminaire and the second luminaire are mutually independently controlled luminaires and are controlled by different power sources, so the control circuit is simple and has low cost without affecting the primary demanded spectra provided by the first luminaire. Therefore, the present application has high utilization rate and high flexibility in use.

DESCRIPTION OF THE REFERENCE DESIGNATORS OF THE COMPONENTS 6. reflector;
61. fixing slot;
7. light source cavity;
8. light source;
9. lampshade;
10. end cover;
11. lamp housing;
12. radiator;
13. seal ring;
14. threaded hole;
100. first luminaire;
200. second luminaire;
300. mounting mechanism.

DETAILED DESCRIPTION OF THE EMBODIMENTS

The generatings of the present invention are described hereinafter through specific embodiments. Those skilled in the art can readily learn other advantages and functions of the present invention from the disclosure of the specification.

It should be noted that the structure, proportion, size, etc. depicted in the drawings of the specification are merely intended to match the contents disclosed in the specification for person familiar with this technology to understand and read, rather than to limit the generating requirements of the present invention, and therefore have no technical significance. Any modifications of the structure, variations of the proportional relationship or adjustments of the size without affecting the desired function and purpose of the present invention shall be considered as falling within the scope of the technical contents disclosed by the present invention. Meanwhile, the terms such as "upper", "lower", "left", "right", "middle", "one", etc. recited in the specification are merely intended to create clear description rather than limit implementable scope of the present invention. Variations or adjustments to the relative relationship, without substantial variation of the technical content, should also be considered as falling within the implementable scope of the present invention.

In the following embodiments, the width direction of the multi-spectrum generating device is defined as the left-right direction, the length direction of the multi-spectrum generating device is defined as the front-rear direction, and the height direction of the multi-spectrum generating device is defined as the up-down direction. Moreover, the left-right direction, the front-rear direction, and the up-down direction are the width direction, the length direction, and the height direction of the first luminaire 100 in the multi-spectrum generating device, respectively. Therefore, the left-right direction is also the horizontal direction described below, the front-rear direction is also the longitudinal direction described below, and the up-down direction is also the vertical direction described below.

Figure 1:
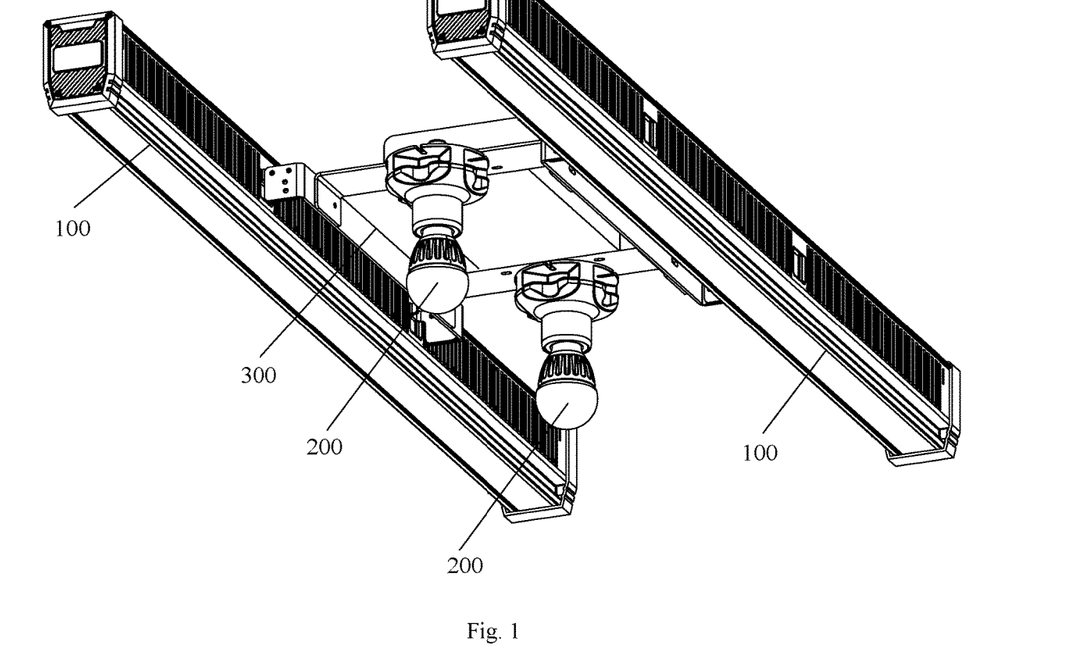
FIG. 1 is a structural schematic diagram of a multi-spectrum generating device in the present application.

The present application provides a multi-spectrum generating method, and a multi-spectrum generating device for implementing the multi-spectrum generating method. As shown in FIG. 1, the multi-spectrum generating device includes at least one first luminaire 100, at least one second luminaire 200, and a control component. The first luminaire 100 and the second luminaire 200 each has a light source. The second luminaire 200 is not integrated in the first luminaire 100. The first luminaire 100 and the second luminaire 200 are independent components. The first luminaire 100 may be referred to as a main lamp, and the second luminaire 200 may be referred to as a sub lamp. The control component is connected to the first luminaire 100 and the second luminaire 200 for controlling the first luminaire 100 and the second luminaire 200. For example, the control unit is configured to control the switches and/or light intensities of the first luminaire 100 and the second luminaire 200. The width $W_{overlap}$ of the overlapped illumination area of the first luminaire 100 and the second luminaire 200 on the illumination receiving surface is greater than or equal to the preset width $W_{target}$ of the illumination target area on the illumination receiving surface. When the multi-spectrum generating device is used in the field of plant growth lighting, both of the first luminaire 100 and the second luminaire 200 are plant lamps. For example, both of the first luminaire 100 and the second luminaire 200 are plant grow lamps or planting working lamps. Preferably, the first luminaire 100 and the second luminaire 200 are mutually independently controlled luminaires, and the control unit independently controls the switches and/or the light intensities of the first luminaire 100 and the second luminaire 200 to achieve at least two spectra. Alternatively, the first luminaire 100 and the second luminaire 200 are integrally controlled luminaires. By preloading a program, that constitutes the power control circuit, in the control unit, the switches and/or light intensities of the first luminaire 100 and the second luminaire 200 are controlled automatically or manually to achieve at least two spectra, thereby meeting different requirements of photobiological regulation, and improving the automation and intellectualization.

Further, the multi-spectrum generating method includes the following steps: Step S1, at least one first luminaire 100 and at least one second luminaire 200 are provided, the first luminaire 100 and the second luminaire 200 each have a light source, and the first luminaire 100 and the second luminaire 200 are mutually independently controlled luminaires. Step A1, position parameters between the first luminaire 100 and the second luminaire 200 are set according to a preset width $W_{target}$ of the illumination target area on the illumination receiving surface to make the width $W_{overlap}$ of the overlapped illumination area of the first luminaire 100 and the second luminaire 200 on the illumination receiving surface greater than or equal to the width $W_{target}$ of the illumination target area. Step S2, the switches and/or light intensities of the first luminaire 100 and the second luminaire 200 independently controlled to achieve at least two spectra.

Figure 2A:
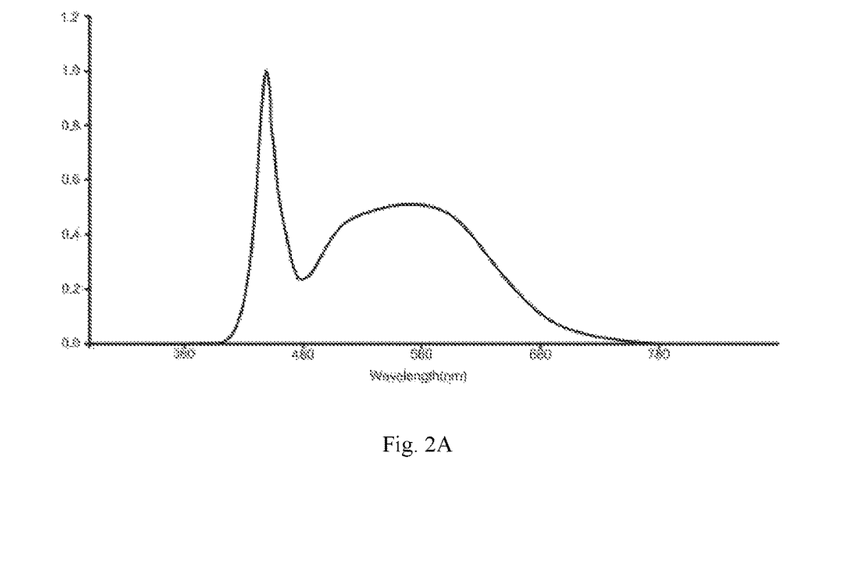
FIGS. 2A-2D are spectrograms of a plurality of spectra that can be obtained by a multi-spectrum generating device of the present application.
Figure 2B:
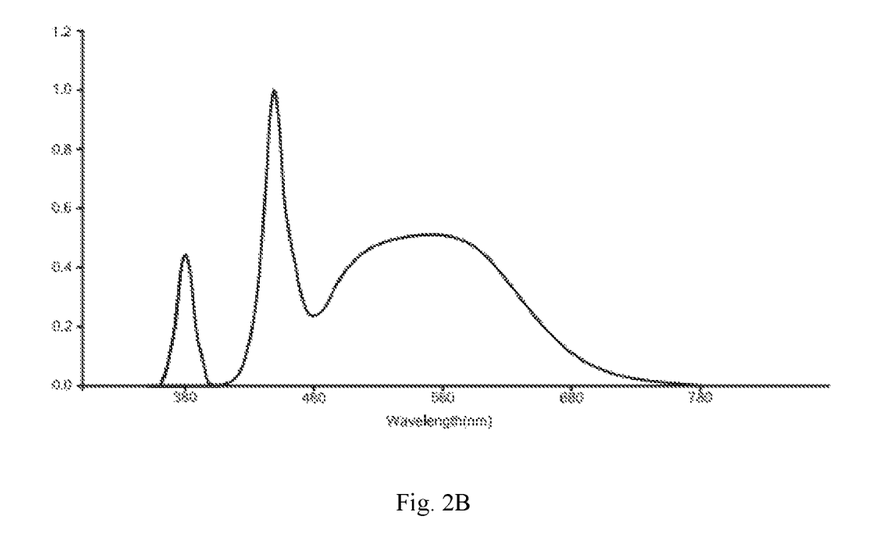
Figure 2C:
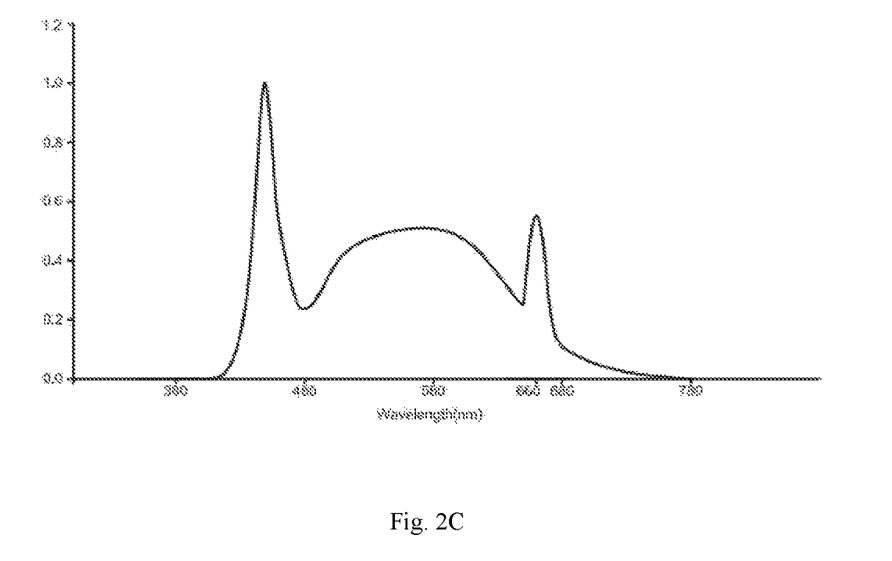
Figure 2D:
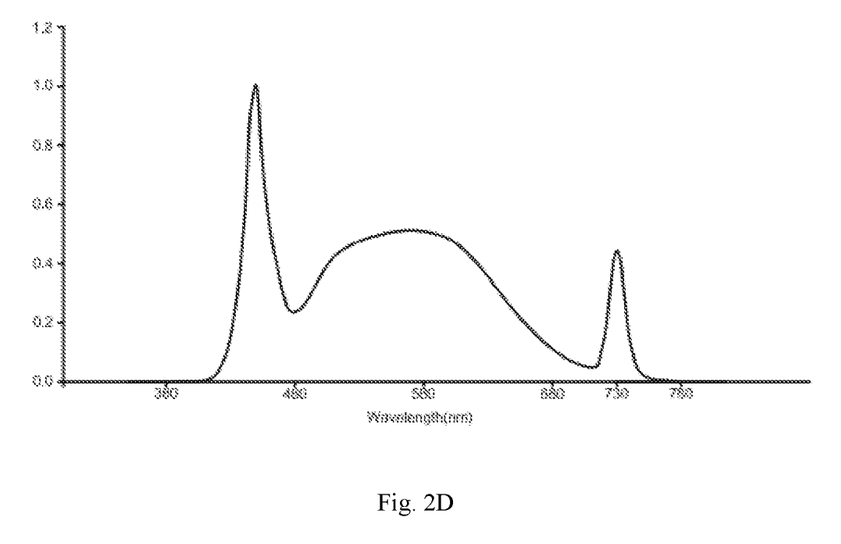

According to the above-described multi-spectrum generating method and device thereof, the first luminaire 100 is configured to provide primary demanded spectra, and the second luminaire 200 is configured to provide other spectra. Therefore, the multi-spectrum generating device combining the first luminaire 100 and the second luminaire 200 can provide at least two spectra. For example, when the first luminaire 100 is turned on and the second luminaires 200 are all turned off, the multi-spectrum generating device can obtain the spectrogram as shown in FIG. 2a. When the first luminaire 100 is turned on and one second luminaire 200 is turned on, with the wavelength of the light source in the second luminaire 200 below 400 nm, the multi-spectrum generating device can obtain the spectrogram as shown in FIG. 2b. When the first luminaire 100 is turned on and one second luminaire 200 is turned on, with the wavelength of the light source in the second luminaire 200 above 700 nm, the multi-spectrum generating device can obtain the spectrogram as shown in FIG. 2c. When the first luminaire 100 is turned on and two second luminaires 200 are turned on, the multi-spectrum generating device can obtain the spectrogram as shown in FIG. 2d. Therefore, by setting the independently controlled first luminaire 100 and second luminaire 200, the present application can realize multi-spectrum. Further, the second luminaire 200 can be used flexible, it can also be switched according to actual demands, and the number of the second luminaires 200 to be turned on can be controlled, so as to meet some special requirements of photobiological regulation and different functional requirements of plant growth. In particular, the first luminaire 100 and the second luminaire 200 are mutually independently controlled luminaires, which are controlled by different power sources, so that the control circuit is simple and has a low cost, while the primary demanded spectra provided by the first luminaire 100 is not affected. Therefore, the present application has a high utilization rate and has a high flexibility in use.

In the above-described multi-spectrum generating device, preferably, two first luminaires 100 are provided, and the two first luminaires 100 are arranged at the left and right. Preferably, two second luminaires 200 are provided, and the two second luminaires 200 are arranged at the front and rear. The two second luminaires 200 are configured between the two first luminaires 100. The spectra of the first luminaires 100 and the spectra of the second luminaires 200 may be identical or different, and the spectra of the plurality of second luminaires may be identical, partially identical, or different.

Figure 3:
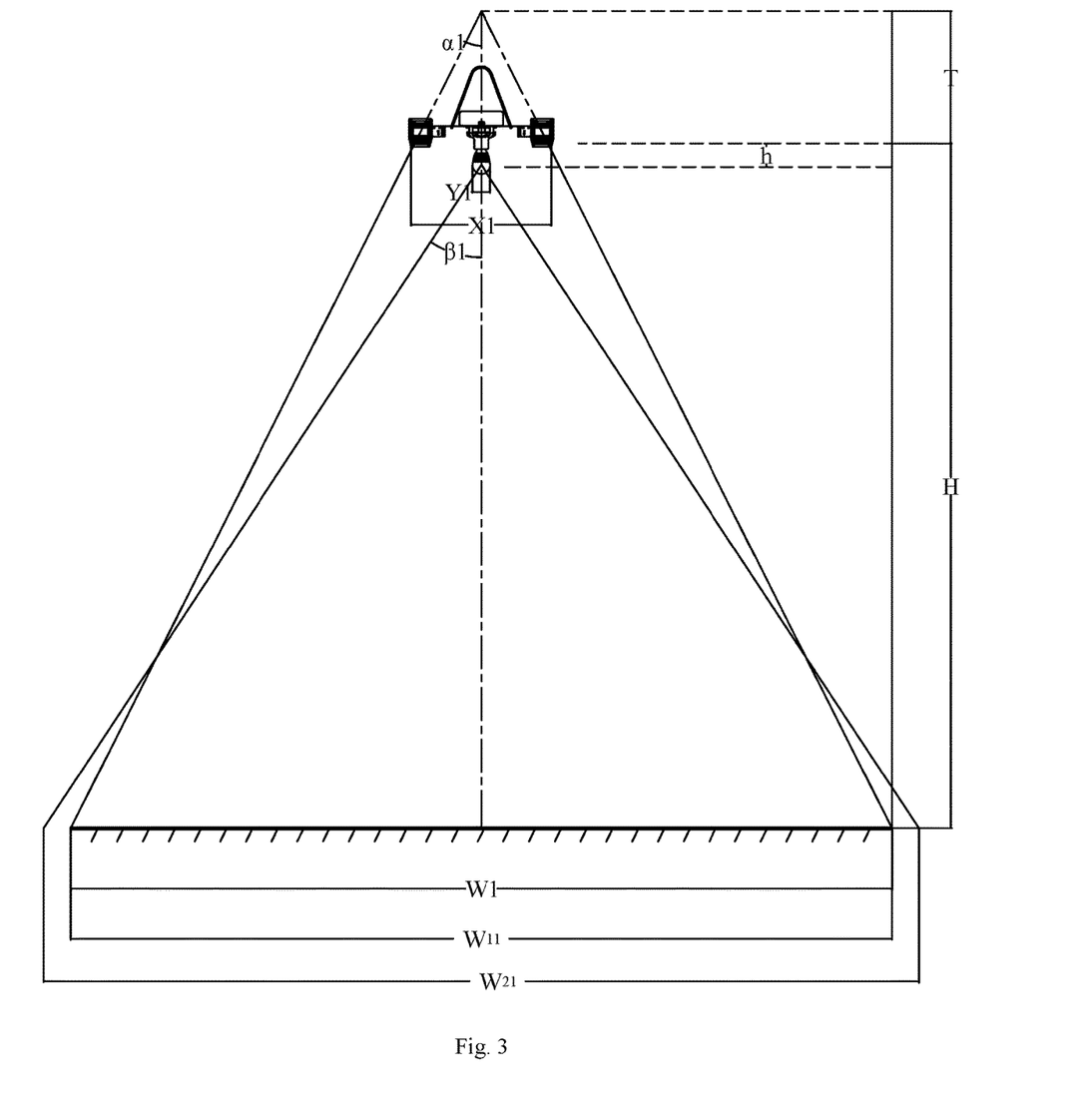
FIG. 3 is a schematic diagram showing the relationship between the respective illumination area of the first luminaire and the second luminaire shown in FIG. 1 in the horizontal direction.
Figure 4:
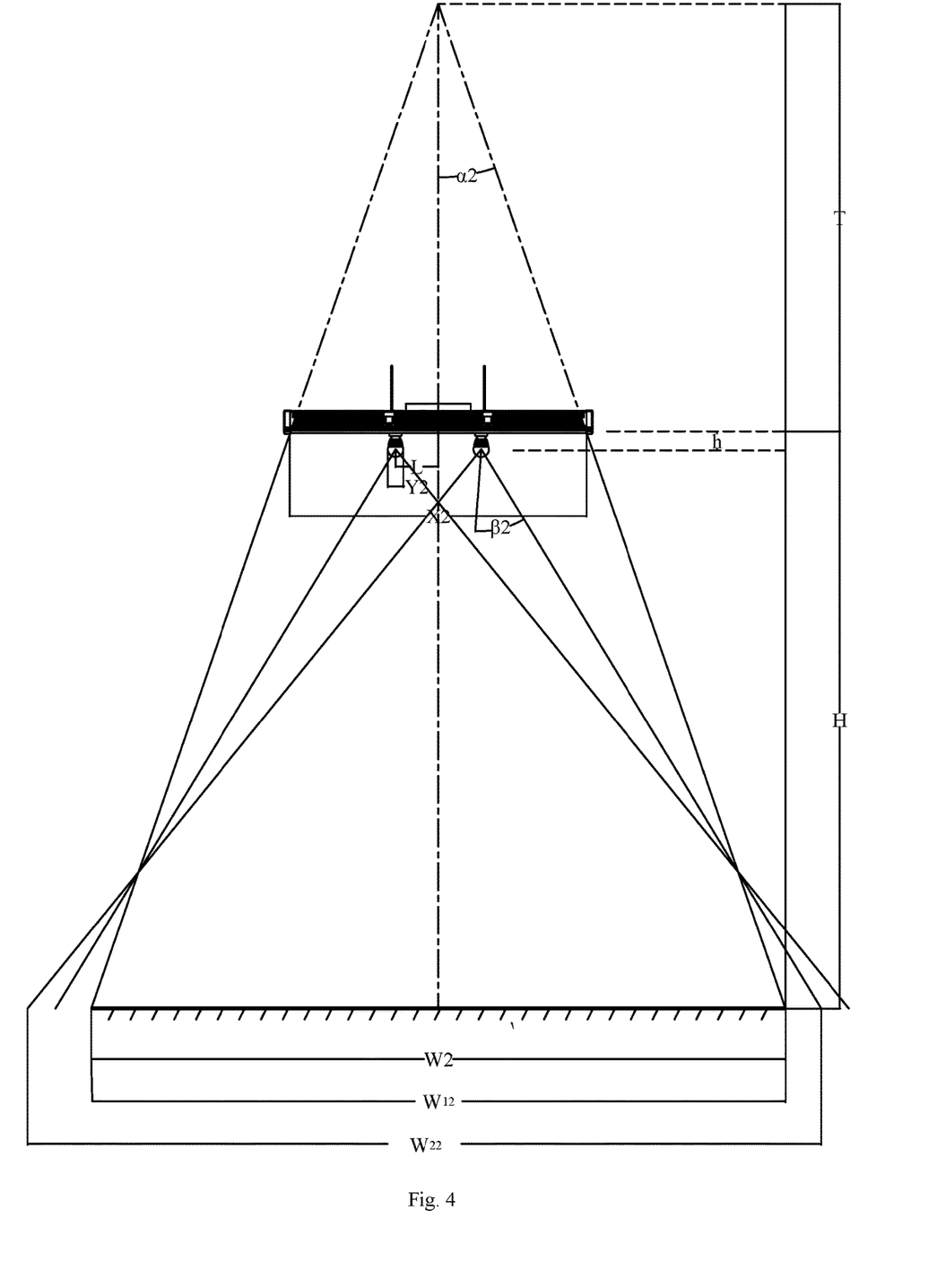
FIG. 4 is a schematic diagram showing the relationship between the respective illumination area of the first luminaire and the second luminaire shown in FIG. 1 in the longitudinal direction.

Further, in the application of the multi-spectrum generating method and device thereof, the position parameters between the first luminaire 100 and the second luminaire 200 need to be set according to the preset width $W_{target}$ of the illumination target area on illumination receiving surface. Namely, the installation positions of the first luminaire 100 and the second luminaire 200 in the multi-spectrum generating device are set. Further, the following conditions need to be satisfied. 1. In the left-right direction and the front-rear direction, the width $W_{overlap}$ of the overlapped illumination area of the first luminaire 100 and the second luminaire 200 on the illumination receiving surface should be greater than or equal to the width $W_{target}$ of the illumination target area. 2. When the second luminaire 200 is located at a central position of a plurality of first luminaires 100, as shown in FIG. 3, the width $W_1$ of the illumination area of the first luminaire 100 on the illumination receiving surface is greater than or equal to the width $W_{target}$ of the illumination target area, and the width $W_2$ of the illumination area of the second luminaire 200 on the illumination receiving surface is greater than or equal to the width $W_{target}$ of the illumination target area. Namely, in the left-right direction, the width $W_{11}$ of the illumination area of the first luminaire 100 on the illumination receiving surface and the width $W_{21}$ of the illumination area of the second luminaire 200 on the illumination receiving surface are both greater than or equal to the left-right target illumination width W1 of the width $W_{target}$ of the illumination target area in the left-right direction; and in the front-rear direction, the width $W_{12}$ of the illumination area of the first luminaire 100 on the illumination receiving surface and the width $W_{22}$ of the illumination area of the second luminaire 200 on the illumination receiving surface are both greater than or equal to the front-rear target illumination width W2 of the width $W_{target}$ of the illumination target area in the front-rear direction. 3. When the second luminaire 200 deviates from the center position of the plurality of first luminaires 100 with a deviation distance of L, as shown in FIG. 4, the width $W_1$ of the illumination area of the first luminaire 100 on the illumination receiving surface is greater than or equal to the width $W_{target}$ of the illumination target area; and the width $W_2$ of the illumination area of the second luminaire 200 on the illumination receiving surface subtracting 2L is greater than or equal to the width $W_{target}$ of the illumination target area. Namely, in the left-right direction, the width $W_{11}$ of the illumination area of the first luminaire 100 on the illumination receiving surface is greater than or equal to the left-right target illumination width $W_1$ of the width $W_{target}$ of the illumination target area in the left-right direction; in the front-rear direction, the width $W_{12}$ of the illumination area of the first luminaire 100 on the illumination receiving surface is greater than or equal to the front-rear target illumination width W2 of the width $W_{target}$ of the illumination target area in the front-rear direction; in the left-right direction, the width $W_{21}$ of the illumination area of the second luminaire 200 on the illumination receiving surface subtracting 2L should be greater than or equal to the left-right target illumination width $W_1$ of the width $W_{target}$ of the illumination target area in the left-right direction; and in the front-rear direction, the width $W_{22}$ of the illumination area of the second luminaire 200 on the illumination receiving surface subtracting 2L should be greater than or equal to the front-rear target illumination width $W_2$ of the width $W_{target}$ of the illumination target area in the front-rear direction.

Further, in the present application, the position parameters between the first luminaire 100 and the second luminaire 200 are set according to the preset width $W_{target}$ of the illumination target area on the illumination receiving surface to make the width $W_1$ of the illumination area of the first luminaire 100 on the illumination receiving surface and the width $W_2$ of the illumination area of the second luminaire 200 on the illumination receiving surface both meet the above requirements. The preferred method is as follows. First, as shown in FIGS. 3 and 4, the position parameters between the first luminaire 100 and the second luminaire 200 include a height H between the light-emitting surface of the light source in the first luminaire 100 and the illumination receiving surface, a height difference h between the light-emitting surface of the light source in the first luminaire 100 and the light-emitting surface of the light source in the second luminaire 200, a ½ beam angle of half-light intensity α1 of the first luminaire 100 in the horizontal direction, a ½ beam angle of half-light intensity β1 of the second luminaire 200 in the horizontal direction, a distance X1 between the first luminaires 100 in the horizontal direction, a width Y1 of the second luminaire 200 in the horizontal direction, a ½ beam angle of half-light intensity α2 of the first luminaire 100 in the longitudinal direction, a ½ beam angle of half-light intensity β2 of the second luminaire 200 in the longitudinal direction, a length X2 of the first luminaire 100 in the longitudinal direction, and a length Y2 of the second luminaire 200 in the longitudinal direction. When the light-emitting surface of the light source in the second luminaire 200 is lower than the light-emitting surface of the light source in the first luminaire 100, the height difference h is a positive value. When the light-emitting surface of the light source in the second luminaire 200 is higher than the light-emitting surface of the light source in the first luminaire 100, the height difference h is a negative value.

Second, as shown in FIG. 3, the following relationship exists in the left-right direction:

$$\tan \alpha 1 = \frac{X1/2}{T} = \frac{W1/2}{H+T}$$

$$T = \frac{X1}{2 \tan \alpha 1}$$

It can be derived that:

$$\frac{W1}{2} = \tan \alpha 1 (H+T) = \tan \alpha 1 \left( H + \frac{X1}{2 \tan \alpha 1} \right)$$

Therefore, the width $W_{11}$ of the illumination area of the first luminaire 100 on the illumination receiving surface in the horizontal direction is as follow:

$$W_{11} = 2 \tan \alpha 1 \times \left( H + \frac{X1}{2 \tan \alpha 1} \right),$$

where the position parameters $\alpha 1$, H and X1 are designed to make $W_{11}$ greater than or equal to W1.

The width $W_{21}$ of the illumination area of the second luminaire 200 on the illumination receiving surface in the horizontal direction is as follow:

$$W_{21} = 2 \tan \beta 1 \times \left[ (H-h) + \frac{Y1}{2 \tan \beta 1} \right],$$

where the position parameters $\beta 1$, H, h and Y1 are designed to make $W_{21}$ greater than or equal to W1.

Similarly, as shown in FIG. 4, the following relationship exists in the front-rear direction:

$$\tan \alpha 2 = \frac{X2/2}{T} = \frac{W2/2}{H+T}$$

$$T = \frac{X2}{2 \tan \alpha 2}$$

It can be derived that:

$$\frac{W2}{2} = \tan \alpha 2 (H+T) = \tan \alpha 2 \left( H + \frac{X2}{2 \tan \alpha 2} \right)$$

Therefore, the width $W_{12}$ of the illumination area of the first luminaire 100 on the illumination receiving surface in the longitudinal direction is as follow:

$$W_{12} = 2 \tan \alpha 2 \times \left( H + \frac{X2}{2 \tan \alpha 2} \right),$$

the position parameters $\alpha 2$, H and X2 are designed to make $W_{12}$ greater than or equal to W2.

The width $W_{22}$ of the illumination area of the second luminaire 200 on the illumination receiving surface in the longitudinal direction is as follow:

$$W_{22} = 2 \tan \beta 2 \times \left[ (H-h) + \frac{Y2}{2 \tan \beta 2} \right],$$

the position parameters $\beta 2$, H, h and Y2 are designed to make $W_{22}$ greater than or equal to W2.

Figure 5:
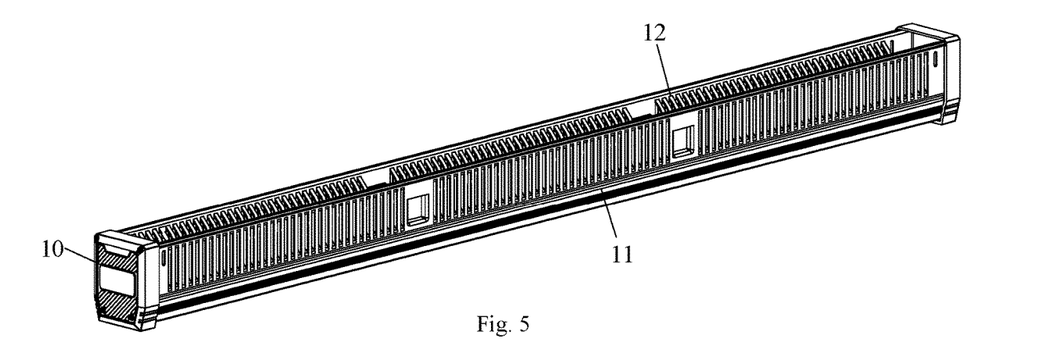
FIG. 5 is a structural schematic diagram of a first luminaire in the present application.
Figure 6:
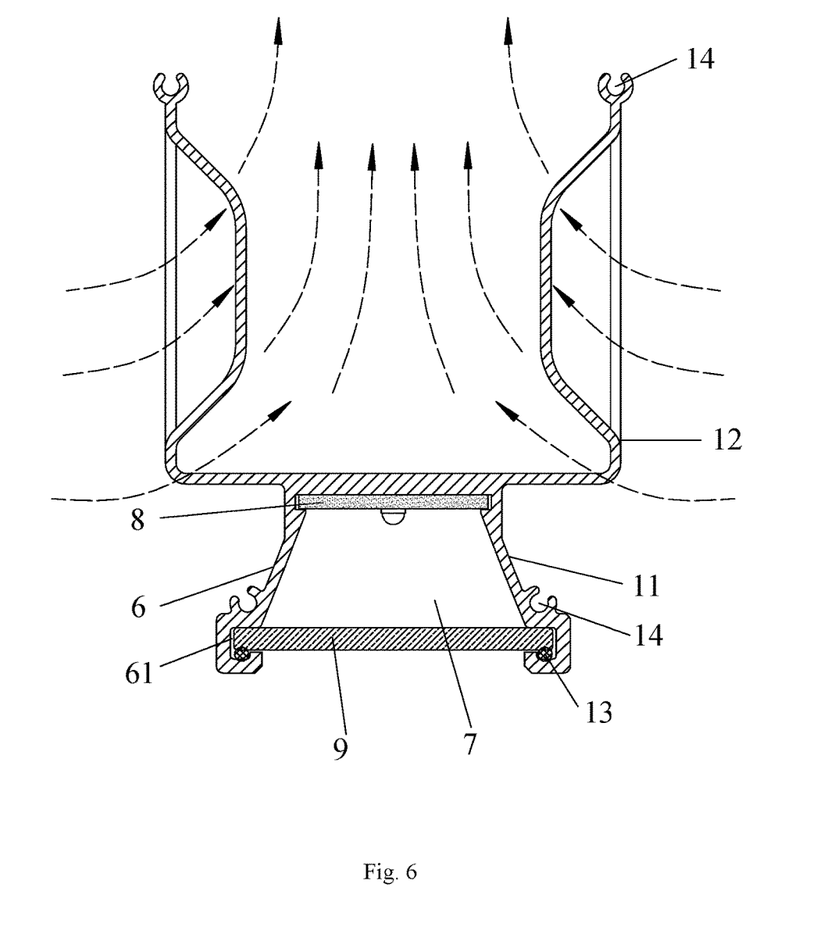
FIG. 6 is a cross-sectional view of FIG. 5.

Further, as shown in FIGS. 5 and 6, the first luminaire 100 at least includes a lamp housing 11, a light source 8 mounted on the lamp housing 11, a lampshade 9 mounted on the lower end of the lamp housing 11, end covers 10 mounted on the front and rear ends of the lamp housing 11, and a radiator 12. The lampshade 9 may be made of transparent glass. A closed light source cavity 7 is formed by the lamp housing 11, the lampshade 9 and the two end covers 10. The light source 8 is located in the light source cavity 7, and the light source 8 constitutes a heat source of the first luminaire 100. The radiator 12 is mounted on the upper end of the lamp housing 11. As shown in FIG. 1, the multi-spectrum generating device further includes a mounting mechanism 300 connected between two first luminaires 100. The mounting mechanism 300 is composed of a plurality of plates, the two second luminaires 200 are fixedly mounted on the lower end surface of the mounting mechanism 300, and the left and right ends of the mounting mechanism 300 are respectively fixed on the radiators 12 in the two first luminaires 100. Therefore, the heat generated by the heat source in the second luminaire 200 can be effectively transmitted to the radiator 12 of the first luminaire 100 through the mounting mechanism 300, which facilitates the radiating of the second luminaire 200.

Further, the lamp housing 11 and the radiator 12 in the first luminaire 100 form an integrated structure. The lamp housing 11 is integrally provided with two reflectors 6 arranged symmetrically at the left and right on the radiator 12, and the two reflectors 6 both extend forward and backward. The inner surface of the reflector 6 is provided with a fixing slot 61, and the left and right edges of the lampshade 9 are respectively fixed in the fixing slots 61 of the two reflectors 6, thereby realizing the connection between the lampshade 9 and the lamp housing 11. In addition, a seal ring 13 mounted in the fixing slot 61 is provided between the lampshade 9 and the reflector 6 for waterproofing. A mounting cavity intercommunicated in front and rear sides is formed among the radiator 12, the reflector 6 and the lampshade 9. The two end covers 10 respectively seal and block the front and rear ends of the mounting cavity to form the closed light source cavity 7. The end covers 10 are fixed on the radiator 12 and the reflector 6 by screws, so the upper end of the radiator 12 and the outer end of the reflector 6 are provided with threaded holes 14 extending forward and backward. The components integrally formed by the radiator 12 and the lamp housing 11 are extruded aluminum profiles or bending plates, which can realize a complicated mounting structure on a single piece of radiator 12, reduce the problems of large thermal resistance and high failure risk caused by multi-part assembly, and make the products have the advantages of better strength, lighter piece weight and lower cost.

In summary, the present invention effectively overcomes various drawbacks in the prior art and has high industrial utilization value.

The above-described embodiments merely exemplify the principles and functions of the present invention and are not intended to limit the present invention. Various modifications or variations of the above-described embodiments may be made by those skilled in the art without departing from the spirit and scope of the present invention. Therefore, all equivalent modifications or variations made by those of ordinary skill in the art without departing from the spirit and technical idea of the present invention should be covered by the appended claims of the present invention.

What is claimed is:

1. A multi-spectrum generating device, comprising: at least one first luminaire, at least one second luminaire, a mounting device connected between the at least one first luminaire and the at least one second luminaire, and a control component; wherein the at least one first luminaire and the at least one second luminaire each have a light source; the control component is connected to the at least one first luminaire and the at least one second luminaire for controlling the at least one first luminaire and the at least one second luminaire wherein each of the at least one first luminaire comprises:
 a lamp housing having a light source cavity, a reflector, a lampshade, a light source mounted in the lamp housing and located in the light source cavity, two end covers and a radiator comprising a heat-radiating baseplate configured for fixing a heat source, and the radiator is mounted at an upper end of the lamp housing, wherein the reflector comprises a reflecting surface facing downwards; and the radiator is mounted at an upper end of the lamp housing;
 the light source is located in a light source cavity and mounted on a lower end surface of the heat-radiating baseplate;
 a seal ring mounted in a fixing slot is provided between the lampshade and the reflector for waterproofing;
 the lampshade is mounted on a lower end of the lamp housing;
 the two end covers are mounted on the front and rear ends of the lamp housing; and the light source cavity is formed by the lamp housing, the lampshade, and the two end covers;
 each of the at least one second luminaire comprises a light source facing downwards; and
 the mounting device is composed of a plurality of plates; the at least one second luminaire is fixedly mounted on a lower end surface of the mounting device, and one end of the mounting device is fixed on the radiator.

2. The multi-spectrum generating device according to claim 1, wherein the at least one first luminaire and the at least one second luminaire are mutually independently controlled luminaires.

3. The multi-spectrum generating device according to claim 1, wherein the at least one first luminaire and the at least one second luminaire are integrally controlled luminaires.

4. The multi-spectrum generating device according to claim 1, wherein position parameters between the at least one first luminaire and the at least one second luminaire are set according to a preset width $W_{target}$ of an illumination target area on an illumination receiving surface to make a width $W_{overlap}$ of an overlapped illumination area of the at least one first luminaire and the at least one second luminaire on the illumination receiving surface greater than or equal to the preset width $W_{target}$ of the illumination target area.

5. The multi-spectrum generating device according to claim 4, wherein the at least one second luminaire is located at a central position of a plurality of the at least one first luminaires; a width $W_1$ of an illumination area of the at least one first luminaire on the illumination receiving surface is greater than or equal to the preset width $W_{target}$ of the illumination target area; and a width $W_2$ of an illumination area of the at least one second luminaire on the illumination receiving surface is greater than or equal to the preset width $W_{target}$ of the illumination target area.

6. The multi-spectrum generating device according to claim 5, wherein the at least one first luminaire comprises two first luminaires and the at least one second luminaire comprises two second luminaires, and the two first luminaires are disposed along a first direction, and the two second luminaires are disposed along a second direction perpendicular to the first direction.

7. The multi-spectrum generating device according to claim 6, wherein the at least one first luminaire provides a first spectra different from a second spectra of the at least one second luminaire.

8. The multi-spectrum generating device according to claim 7, wherein the two second luminaires are fixedly mounted on the lower end surface of the mounting device, and left and right ends of the mounting device are respectively fixed on radiators of the two first luminaires.

9. The multi-spectrum generating device according to claim 4, wherein the second luminaire deviates from a center position of a plurality of the at least one first luminaires with a deviation distance of L; a width $W_1$ of an illumination area of the at least one first luminaire on the illumination receiving surface is greater than or equal to the preset width $W_{target}$ of the illumination target area; and a width $W_2$ of an illumination area of the at least one second luminaire on the illumination receiving surface subtracting 2L is greater than or equal to the preset width $W_{target}$ of the illumination target area.

10. The multi-spectrum generating device according to claim 9, wherein the at least one first luminaire comprises two first luminaires and the at least one second luminaire comprises two second luminaires, and the two first luminaires are disposed along a first direction, and the two second luminaires are disposed along a second direction perpendicular to the first direction.

11. The multi-spectrum generating device according to claim 10, wherein the at least one first luminaire provides a first spectra different from a second spectra of the at least one second luminaire.

12. The multi-spectrum generating device according to claim 11, wherein the two second luminaires are fixedly mounted on the lower end surface of the mounting device, and left and right ends of the mounting device are respectively fixed on radiators of the two first luminaires.

13. The multi-spectrum generating device according to claim 1, wherein the at least one second luminaire is located at a central position of a plurality of the at least one first luminaires; a width $W_1$ of an illumination area of the at least one first luminaire on an illumination receiving surface is greater than or equal to a preset width $W_{target}$ of an illumination target area on the illumination receiving surface; and a width $W_2$ of an illumination area of the at least one second luminaire on the illumination receiving surface is greater than or equal to the preset width $W_{target}$ of the illumination target area.

14. The multi-spectrum generating device according to claim 1, wherein the second luminaire deviates from a center position of a plurality of the at least one first luminaires with a deviation distance of L; a width $W_1$ of an illumination area of the at least one first luminaire on an illumination receiving surface is greater than or equal to the preset width $W_{target}$ of an illumination target area on the illumination receiving surface; and a width $W_2$ of an illumination area of the at least one second luminaire on the illumination receiving surface subtracting 2L is greater than or equal to the width $W_{target}$ of the illumination target area.

15. The multi-spectrum generating device according to claim 1, wherein when a plurality of the at least one second luminaires are provided, spectra of the plurality of the at least one second luminaires are identical, partially identical, or different.

16. The multi-spectrum generating device according to claim 1, wherein spectra of the at least one first luminaire and spectra of the at least one second luminaire are different.

17. The multi-spectrum generating device according to claim 1, wherein the at least one first luminaire and the at least one second luminaire are plant luminaires.

* * * * *